(12) United States Patent
Zeng et al.

(10) Patent No.: US 11,859,782 B2
(45) Date of Patent: Jan. 2, 2024

(54) AC TWO-WIRE LED HIGH VOLTAGE LAMP STRING WITH SYNCHRONOUS DIMMING AND COLOR ADJUSTMENT

(71) Applicant: Zhejiang Twinsel Electronic Technology Co., Ltd., Zhejiang (CN)

(72) Inventors: Xueren Zeng, Zhejiang (CN); Jiawei Li, Zhejiang (CN); Rongqu Tang, Zhejiang (CN); Jianping Yan, Zhejiang (CN); Lizong Hu, Zhejiang (CN); Wei Yi, Zhejiang (CN); Xiaofeng Tang, Zhejiang (CN)

( * ) Notice: Subject to any disclaimer, the term of this patent is extended or adjusted under 35 U.S.C. 154(b) by 48 days.

(21) Appl. No.: 17/512,668

(22) Filed: Oct. 28, 2021

(65) Prior Publication Data
US 2023/0027092 A1 Jan. 26, 2023

(30) Foreign Application Priority Data
Jul. 16, 2021 (CN) .......................... 202110804542.4

(51) Int. Cl.
*F21S 4/10* (2016.01)
*H05B 45/20* (2020.01)
(Continued)

(52) U.S. Cl.
CPC .............. *F21S 4/10* (2016.01); *F21V 23/003* (2013.01); *F21V 23/04* (2013.01); *H05B 45/10* (2020.01);
(Continued)

(58) Field of Classification Search
CPC .... H01R 2103/00; H01R 24/22; H01R 29/00; H01R 25/003; H01R 27/02; H01R 13/6675; H01R 2201/04; H01R 2201/06; H01R 13/648; H01R 24/30; H01R 4/34; H01R 4/643; H01R 13/68; H01R 11/12; H01R 4/302; H01R 13/713; H01R 13/73; H01R 13/652; H01R 13/6666; H01R 24/78; H01R 13/66; H01R 13/701; H01R 24/52;
(Continued)

(56) References Cited

U.S. PATENT DOCUMENTS 5,831,515 A * 11/1998 Stewart .................... G08B 3/10
340/471
8,450,950 B2 * 5/2013 McRae ................. H05B 45/20
315/318
(Continued)

*Primary Examiner* — Monica C King
(74) *Attorney, Agent, or Firm* — Prakash Nama; Global IP Services, PLLC

(57) ABSTRACT

An AC two-wire LED high voltage lamp string with synchronous dimming and color adjustment comprises a high voltage controller and a lamp string group, wherein the high voltage controller comprises a control box, and a first power supply module, a switch control circuit and a first microcontrol unit which are arranged in the control box and connected in sequence; the first power supply module is connected with the switch control circuit and the first microcontrol unit; a second microcontrol unit. The present invention modulates and encodes a high voltage sine wave using the switch control circuit at the controller end and demodulates the sine wave at a bulb end to realize the functions of color change timing, flashing, timing and light control of lamp strings. The lamp strings can be used individually or connected in series and in parallel for use, to satisfy different needs of consumers.

10 Claims, 11 Drawing Sheets

(51) Int. Cl.
*H05B 45/10* (2020.01)
*H05B 45/3725* (2020.01)
*F21V 23/00* (2015.01)
*F21V 23/04* (2006.01)
*F21Y 115/10* (2016.01)

(52) U.S. Cl.
CPC ......... *H05B 45/20* (2020.01); *H05B 45/3725* (2020.01); *F21Y 2115/10* (2016.08)

(58) Field of Classification Search
CPC .......... H01R 24/68; H01R 24/70; H01R 9/03; H01R 13/684; H01R 13/70; H01R 13/7137; H01R 31/065; H01R 4/304; H01R 11/03; H01R 13/10; H01R 13/6658; H01R 13/7132; H01R 31/005; H01R 33/95; H01R 4/26; H01R 9/2641; H01R 13/025; H01R 13/04; H01R 13/20; H01R 13/2442; H01R 13/512; H01R 13/6275; H01R 13/629; H01R 13/631; H01R 13/6456; H01R 13/688; H01R 24/20; H01R 24/28; H01R 31/06; H01R 33/945; H01R 4/66; H01R 43/26; H02J 2207/40; H02J 7/00047; H02J 1/10; H02J 7/00036; H02J 1/00; H02J 7/00; H02J 7/00309; H02J 3/381; H02J 2300/24; H02J 7/00045; H02J 7/0045; H02J 2310/14; H02J 3/30; H02J 3/32; H02J 7/0042; H02J 7/007; H02J 7/02; H02J 2300/26; H02J 5/00; H02J 50/005; H02J 50/10; H02J 7/00034; H02J 7/0013; H02J 7/0024; H02J 7/00302; H02J 7/00306; H02J 7/0031; H02J 7/35; H02J 1/001; H02J 1/14; H02J 2207/20; H02J 3/38; H02J 3/40; H02J 3/466; H02J 50/12; H02J 50/40; H02J 50/50; H02J 7/00032; H02J 7/0048; H02J 7/0063; H02J 7/007182; H02J 9/02; H02J 9/061; F21V 23/06; F21V 21/005; F21V 23/003; F21V 23/0435; F21V 23/002; F21V 14/003; F21V 14/02; F21V 14/06; F21V 17/02; F21V 21/025; F21V 21/04; F21V 21/096; F21V 21/112; F21V 21/14; F21V 21/15; F21V 21/16; F21V 21/22; F21V 21/29; F21V 21/30; F21V 21/35; F21V 21/38; F21V 7/10; F21V 23/02; F21V 23/04; F21V 29/83; F21V 17/16; F21V 21/02; F21V 23/005; F21V 23/0471; F21V 25/00; F21V 25/02; F21V 25/12; F21V 3/00; F21V 33/0076; F21V 17/002; F21V 23/001; F21V 23/008; F21V 23/009; F21V 23/0442; F21V 23/045; F21V 29/506; F21V 29/677; F21V 29/74; F21V 29/763; F21V 33/00; F21V 33/0028; F21V 33/004; F21V 33/0052; F21V 23/007; F21V 31/005; H05B 47/19; H05B 45/20; H05B 45/30; H05B 47/18; H05B 45/10; H05B 47/12; H05B 47/11; H05B 47/125; H05B 47/13; H05B 47/14; H05B 45/3578; H05B 45/325; H05B 47/155; H05B 45/37; H05B 45/12; H05B 45/3577; H05B 45/3725; H05B 45/375; H05B 45/40; H05B 47/115; H05B 47/165; H05B 45/357; H05B 47/16; H05B 47/175; F21S 2/005; F21S 10/005; F21S 8/066; F21S 4/10; F21S 4/26; F21S 6/002; F21S 6/008; F21S 8/033; F21S 8/035; F21S 8/04; F21S 8/06
See application file for complete search history.

(56) References Cited

U.S. PATENT DOCUMENTS

| | | | |
|---|---|---|---|
| 8,760,293 B2* | 6/2014 | Steiner | G01J 1/0219 340/567 |
| 2010/0265724 A1* | 10/2010 | Yang | F21S 8/086 362/344 |
| 2015/0084515 A1* | 3/2015 | Altamura | H05B 45/20 315/131 |
| 2015/0373796 A1* | 12/2015 | Bahrehmand | H05B 45/325 315/129 |
| 2016/0091196 A1* | 3/2016 | Chien | F21V 33/0004 362/253 |
| 2016/0313636 A1* | 10/2016 | Chien | F21V 21/08 |
| 2019/0032898 A1* | 1/2019 | Chen | F21V 27/00 |
| 2019/0101257 A1* | 4/2019 | Boulanger | F21V 23/007 |
| 2019/0253670 A1* | 8/2019 | Chien | F21K 9/233 |
| 2019/0320515 A1* | 10/2019 | Sadwick | H05B 45/00 |
| 2020/0340659 A1* | 10/2020 | Huang | G08B 17/06 |
| 2021/0076529 A1* | 3/2021 | Pachoud | H04L 41/24 |

* cited by examiner

AC TWO-WIRE LED HIGH VOLTAGE LAMP STRING WITH SYNCHRONOUS DIMMING AND COLOR ADJUSTMENT

BACKGROUND OF THE INVENTION

The present invention relates to the technical field of illuminating lamp strings, and particularly relates to an AC two-wire LED high voltage lamp string with synchronous dimming and color adjustment.

With the rapid development and continuous cost reduction of the LED technology, as a branch of LED illumination, an LED high voltage lamp string is very popular in Chinese, European and American markets. As illumination, holiday decoration and plant growth supplement light, the LED high voltage lamp string has strong market demand growth and huge potential. However, similar products on the market are mainly single-color LEDs or are flashed and lighted with cold white, warm white and separate red, green and blue. Consumers cannot freely switch their favorite colors.

BRIEF SUMMARY OF THE INVENTION

The purpose of the present invention is to provide an AC two-wire LED high voltage lamp string with synchronous dimming and color adjustment, which modulates and encodes a high voltage sine wave using a switch control circuit at a controller end and demodulates the sine wave at a bulb end to realize the functions of color change timing, flashing, timing and light control of lamp strings.

Technical solutions adopted to solve the above technical problems by the present invention are as follows:

An AC two-wire LED high voltage lamp string with synchronous dimming and color adjustment comprises a high voltage controller and a lamp string group.

The high voltage controller comprises a control box, and a first power supply module, a switch control circuit, a first microcontrol unit and a mode adjustment switch which are arranged in the control box and connected in sequence; and the first microcontrol unit is connected with the first power supply module.

The first power supply module is provided with a first AC input end for external connection, and the first AC input end comprises a live line end and a neutral line end; the first microcontrol unit is used to receive a switch signal of the mode adjustment switch and transmit the signal to the switch control circuit; the switch control circuit is used for waveform modulation encoding of AC sine waves inputted by the first power supply module under the signal control of the first microcontrol unit; and the first microcontrol unit is used for zero-crossing detection of AC of the first power supply module.

The high voltage controller is also provided with an AC output end; the AC output end comprises a first AC output end connected with the first power supply module and a second AC output end connected with the switch control circuit; the control box is provided with a connecting hole, and the first AC input end and the AC output end are respectively connected with the outside through the connecting hole; and the AC output end is connected with a connector, and the connector is detachably connected with the LED lamp string group.

The LED lamp string group comprises LED lamps which are connected mutually; the LED lamp string group is provided with a tail plug joint connected with the connector; a second power supply module, a carrier signal detecting module, a second microcontrol unit and a lighting module are arranged in the LED lamps.

The second power supply module is provided with a second AC input end electrically connected with the AC output end, and the second power supply module is used for supplying power for the second microcontrol unit and the lighting module.

The second power supply module is connected with the carrier signal detecting module, the second microcontrol unit and the lighting module in sequence; the carrier signal detecting module is used for detecting a carrier signal received by the second AC input end and transmitting a carrier code value to the second microcontrol unit; after receiving the carrier signal, the second microcontrol unit executes a corresponding lighting instruction so that the lighting module enters a lighting mode which is set by the code value.

Further, the high voltage controller is also provided with an overload protection module; the overload protection module is respectively connected with the first power supply module, the switch control circuit and the first microcontrol unit for transmitting a voltage signal to the first microcontrol unit when the first power supply module and the switch control circuit are overloaded; and the first microcontrol unit is used for controlling the switch control circuit to cut off the switch after receiving the overload signal.

Further, the LED lamp comprises a lamp cap, a connecting shell and a lampshade which are connected in sequence; the second power supply module, the carrier signal detecting module and the second microcontrol unit are arranged on a power board; the power board is arranged in the connecting shell; the lighting module comprises an LED board and an LED lamp bead arranged on the LED board; the LED lamp bead is electrically connected with the second microcontrol unit; and the LED board is arranged in the connecting shell.

Further, the lamp cap, the connecting shell and the lampshade are connected in sequence through threads.

Further, the AC two-wire LED high voltage lamp string further comprises a slot arranged in the connecting shell, wherein the power board is inserted into the slot and the LED board is fixedly connected with the power board.

Further, the AC two-wire LED high voltage lamp string further comprises a photodiode which is connected with the second microcontrol unit for light control.

Further, the AC two-wire LED high voltage lamp string further comprises a conducting cap arranged above the lamp cap, wherein the conducting cap is inserted into the lamp cap and electrically connected with the second AC input end; and the upper end of the conducting cap is connected with a conducting wire.

Further, the mode adjustment switch comprises a color adjustment switch and a timing switch; the color adjustment switch and the timing switch are respectively connected with a button and a knob; and the button and the knob are arranged on the outer wall of the control box.

Further, the AC two-wire LED high voltage lamp string further comprises a storage chip, wherein the storage chip is connected with the first microcontrol unit, and the storage chip is used to store operating state data and realize power off memory.

Further, the AC two-wire LED high voltage lamp string further comprises an indicator lamp arranged on the control box, wherein the indicator lamp is connected with the first microcontrol unit.

Compared with the prior art, the present invention has the following beneficial effects:

The present invention modulates and encodes the high voltage sine wave using the switch control circuit at the controller end and demodulates the sine wave at the bulb end to realize the functions of color change timing, flashing, timing and light control of lamp strings. The lamp strings can be used individually or connected in series and in parallel for use, to satisfy different needs of consumers.

Reference signs: 1 light guide column; 2 knob; 3 knob sealing ring; 4 controller power board; 5 upper housing; 6 color adjustment switch; 7 connector; 8 tail plug joint; 9 threaded connection seat; 10 screw sealing ring; 11 high voltage control box sealing ring; 12 bottom plate; 13 screw; 14 plug; 15 timing switch; 16 lampshade; 17 lighting module; 18 power board module; 19 connecting shell; 20 lamp cap; 21 conducting cap; 22 first power supply module; 23 switch control circuit; 24 overload protection module; 25 control module; 251 first microcontrol unit; 252 storage chip; 253 power indicator light; 26 second power supply module; 27 carrier signal detecting module; 28 lighting execution module; 281 second microcontrol unit.

DETAILED DESCRIPTION OF THE INVENTION

The present invention is further described below in detail in combination with the drawings and embodiments.

Figure 1:
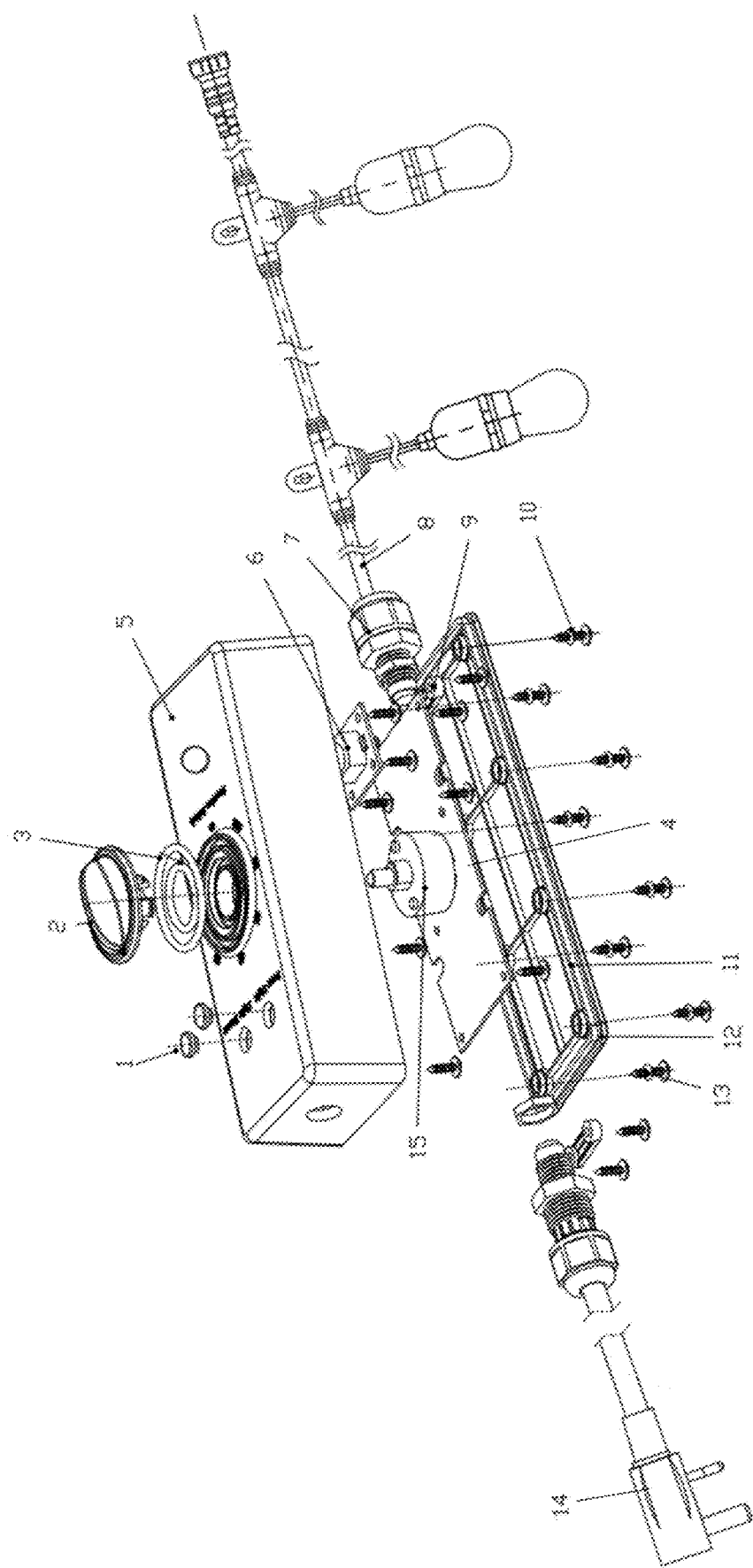
FIG. 1 is a connection schematic diagram of an AC two-wire LED high voltage lamp string with synchronous dimming and color adjustment in the present invention.

As shown in FIG. 1, an AC two-wire LED high voltage lamp string with synchronous dimming and color adjustment comprises a high voltage controller and a lamp string group.

The high voltage controller comprises a control box. As shown in FIGS. 3, 5, 6, 7 and 8, a first power supply module 22, a switch control circuit 23, an overload protection module 24 and a control module 25 are arranged in the control box; the control module 25 comprises a first microcontrol unit 251, a storage chip 252, a mode adjustment switch and a power indicator light 253; and the mode adjustment switch comprises a color adjustment switch 6 and a timing switch 15. In the present embodiment, the first microcontrol unit 251 can be the existing AS3010 chip, etc.

The first power supply module 22 is provided with a first AC input end for external connection, and the first AC input end comprises a live line end and a neutral line end. The first power supply module 22, the switch control circuit 23 and the first microcontrol unit 251 are connected in sequence; and the first microcontrol unit 251 is respectively connected with the color adjustment switch 6 and the timing switch 15. After the color adjustment switch 6 or the timing switch 15 is pulled, the switch signal is transmitted to the first microcontrol unit 251. The switch control circuit 23 is used for waveform modulation encoding of AC sine waves inputted by the first power supply module 22 under the control of the first microcontrol unit 251.

The high voltage controller is also provided with an AC output end; the AC output end comprises a first AC output end connected with the first power supply module 22 and a second AC output end connected with the switch control circuit 23.

The first microcontrol unit 251 is respectively connected with the first power supply module 22, the storage chip 252 and the power indicator light 253. The first microcontrol unit 251 is also used for zero-crossing detection of AC of the first power supply module 22. The storage chip 252 is used to store operating state data and realize power off memory.

The overload protection module 24 is respectively connected with the first power supply module 22, the switch control circuit 23 and the first microcontrol unit 251. A silicon controlled rectifier is arranged in the switch control circuit 23. When the first power supply module 22 and the switch control circuit 23 are overloaded, the overload protection module 24 transmits a voltage signal for the first microcontrol unit 251. After receiving the overload voltage signal, the first microcontrol unit 251 controls the switch control circuit 23 to close the silicon controlled rectifier, thereby cutting off the circuit.

As shown in FIG. 1, the control box comprises an upper housing 5 and a bottom plate 12; the upper housing 5 is provided with a containing cavity; the upper housing 5 is covered on the bottom plate 12; a high voltage control box sealing ring 11 is arranged between the upper housing 5 and the bottom plate 12; the bottom plate 12 is provided with a threaded connection seat 9; the upper housing 5 is connected with the bottom plate 12 through a screw 13; a screw sealing ring 10 is arranged between the screw 13 and the bottom plate 12; the bottom plate is provided with a controller power board 4; and the first power supply module 22, the switch control circuit 23, the first microcontrol unit 251, the overload protection module 24, the color adjustment switch 6, the timing switch 15, the storage chip 252 and the power indicator light 253 are arranged on the controller power board 4.

The color adjustment switch 6 is a button switch, and the timing switch 15 is a knob switch. A knob 2 is arranged outside the upper housing 5, and the knob 2 is connected with the timing switch 15. A through hole through which the color adjustment switch 6 passes is arranged outside the upper housing 5; the color adjustment switch 6 extends out from the upper housing 5; the upper housing 5 is provided with a light guide column 1; and the light guide column 1 is connected with the power indicator light 253.

The control box is provided with a connecting hole, and the first AC input end and the AC output end are respectively connected with the outside through the connecting hole; the AC output end is connected with a connector 7, and the connector 7 is a waterproof connector; and the connector 7 is detachably connected with the LED lamp string group.

The LED lamp string group comprises LED lamps which are connected mutually; the end of the LED lamp string group is provided with a tail plug joint 8 connected with the connector 7; and the tail plug joint 8 is inserted into the connector 7 to realize electrical connection between the LED lamp string group and the controller.

Figure 9:
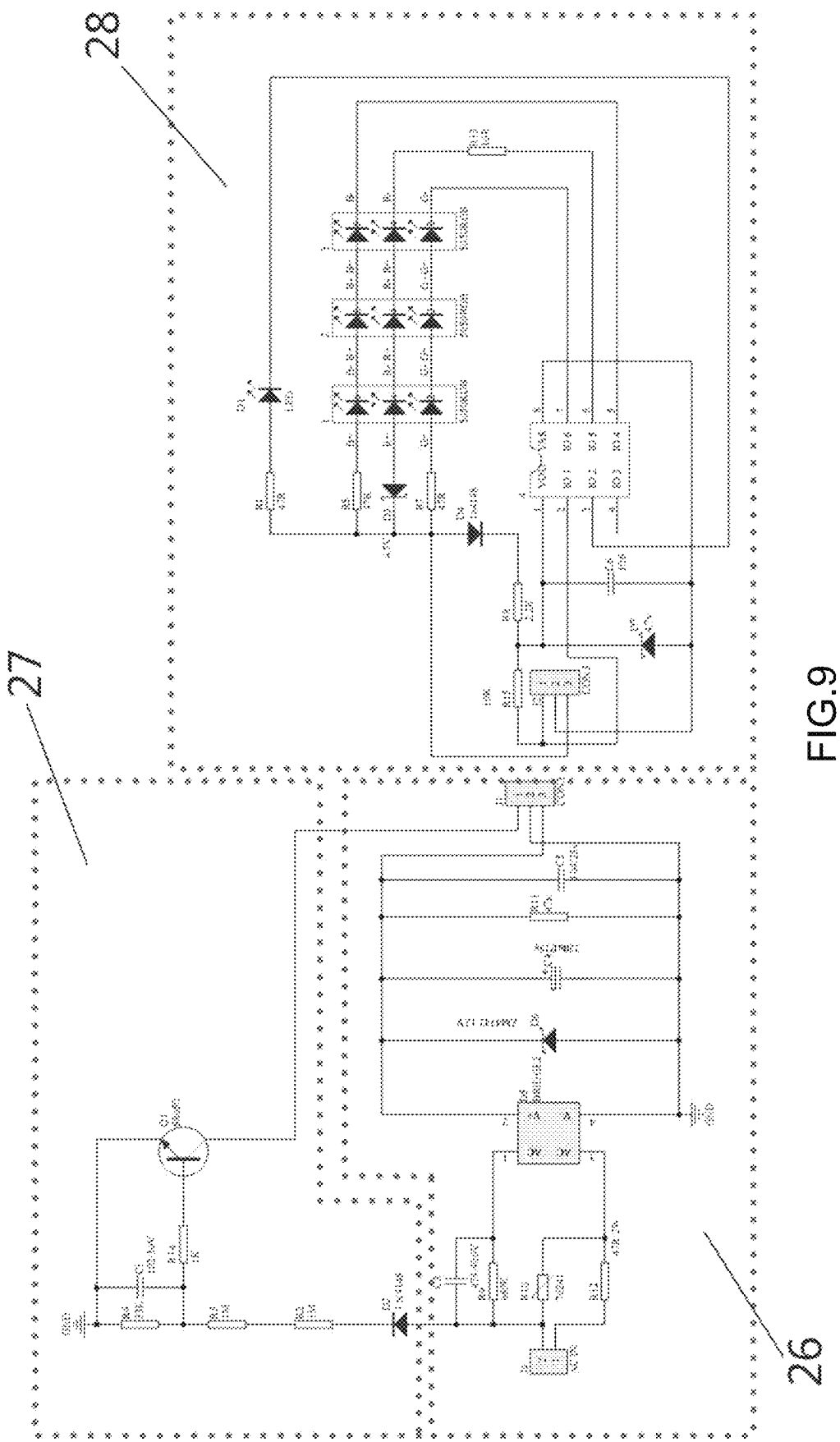
FIG. 9 is a schematic diagram of an LED lamp of an AC two-wire LED high voltage lamp string with synchronous dimming and color adjustment in the present invention.
Figure 10:
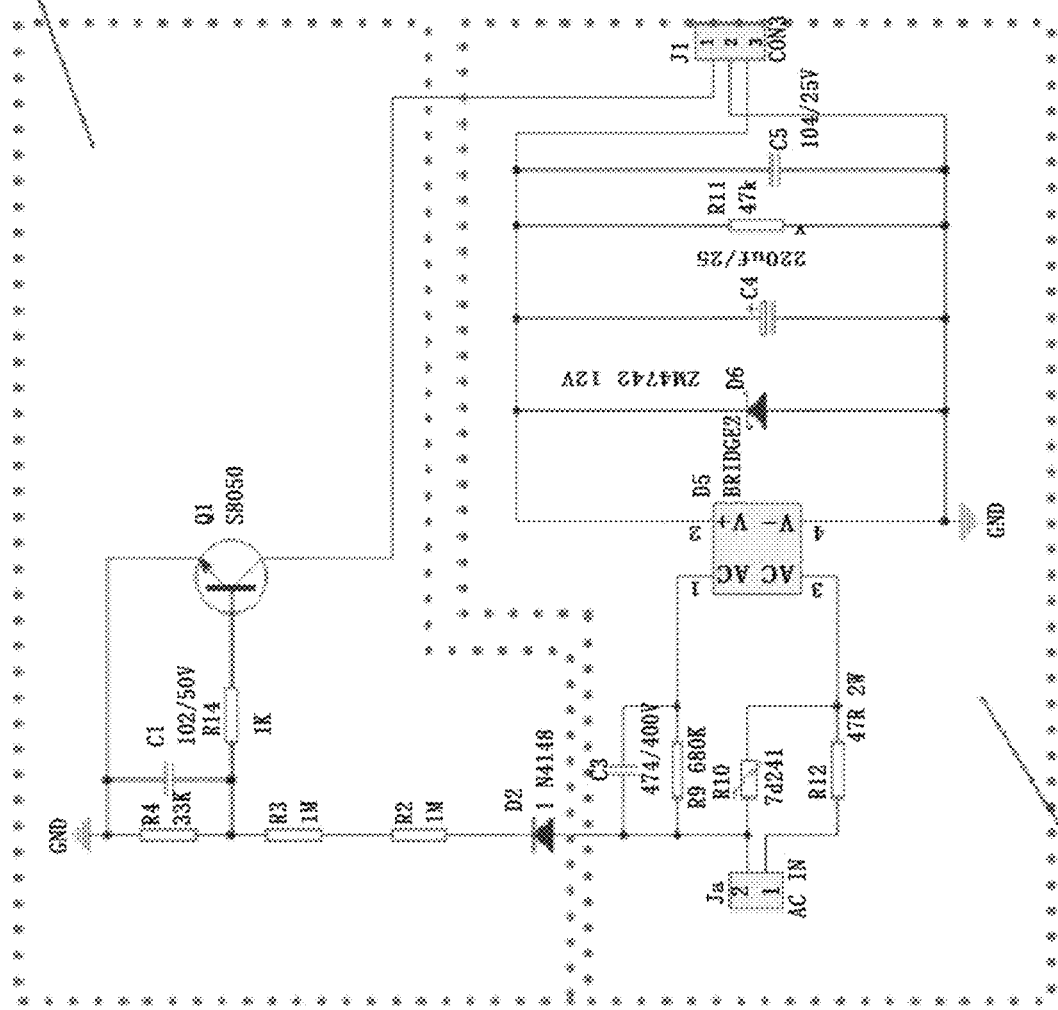
FIG. 10 is a local enlarged view of FIG. 9.
Figure 11:
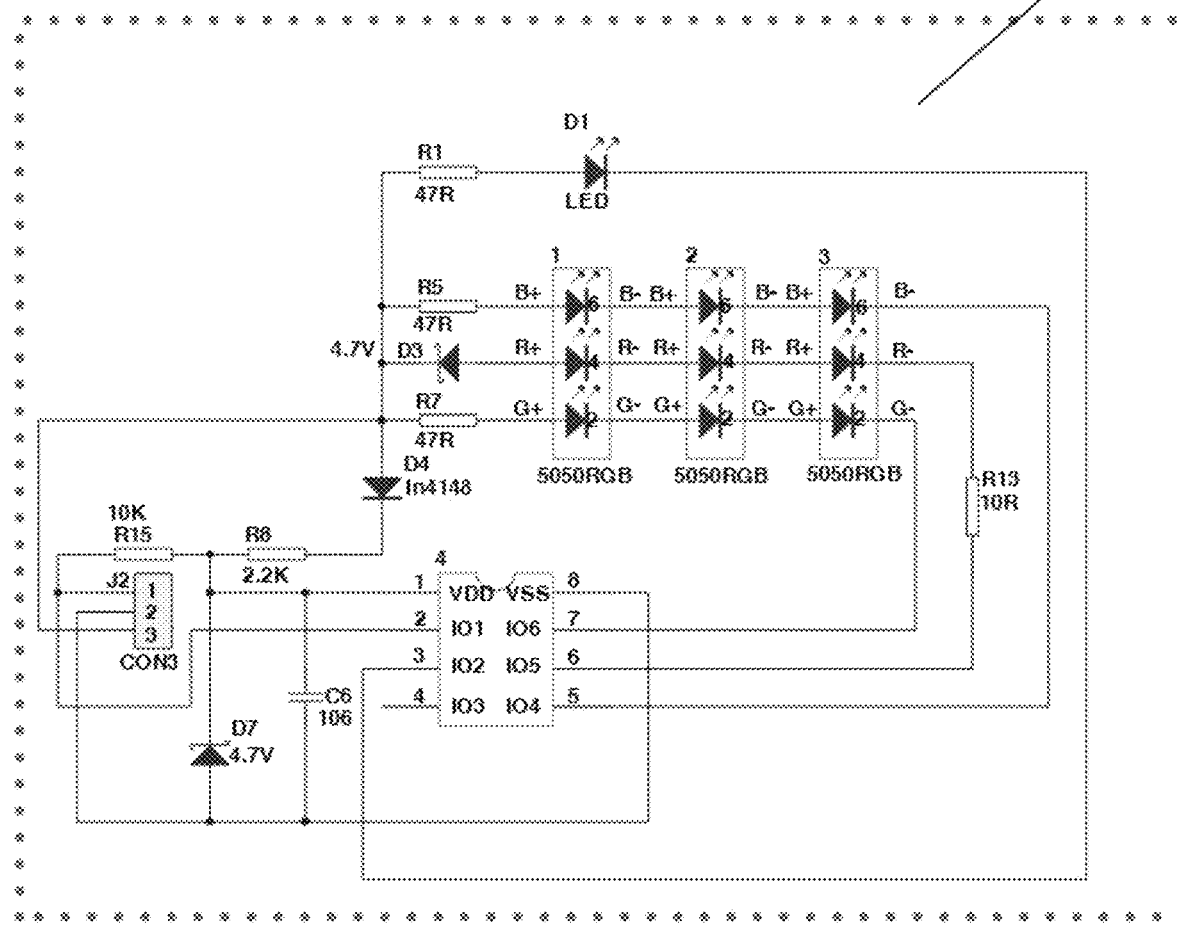
FIG. 11 is a local enlarged view of FIG. 9.

As shown in FIGS. 9, 10 and 11, a second power supply module 26, a carrier signal detecting module 27 and a lighting execution module 28 are arranged in the LED lamps; and the lighting execution module 28 comprises a second microcontrol unit 281 and a lighting module 17.

The second power supply module 26 is provided with a second AC input end electrically connected with the AC output end, and the second power supply module 26 is used for supplying power for the second microcontrol unit 281 and the lighting module 17.

The second power supply module 26 is connected with the carrier signal detecting module 27, the second microcontrol unit 281 and the lighting module 17 in sequence; the carrier signal detecting module 27 is used for detecting a carrier signal received by the second AC input end and transmitting a carrier code value to the second microcontrol unit 281; and after receiving the carrier code value, the second microcontrol unit 281 executes a corresponding lighting instruction so that the lighting module 17 enters a lighting mode which is set by the code value. In the lighting mode, the carrier signal detecting module 27 detects the weekly zero crossing signal of the AC sine wave and sends the signal to the second microcontrol unit as a flashing frequency reference to ensure that a plurality of bulbs flash synchronously.

The second microcontrol unit 281 is also connected with a photodiode for realizing light control.

Figure 2:
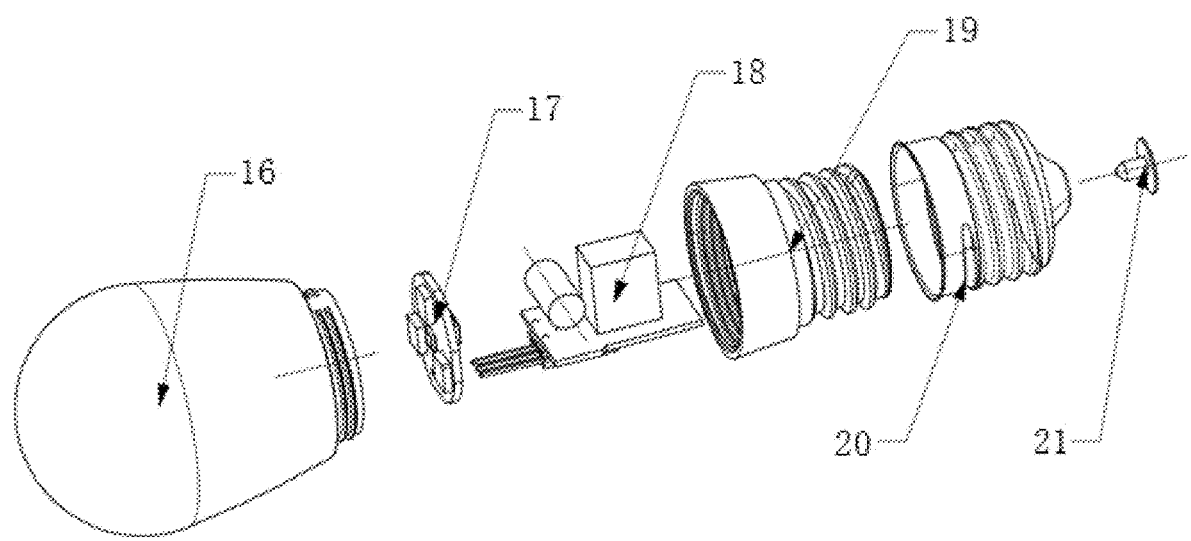
FIG. 2 is an exploded view of an LED lamp of an AC two-wire LED high voltage lamp string with synchronous dimming and color adjustment in the present invention.
Figure 3:
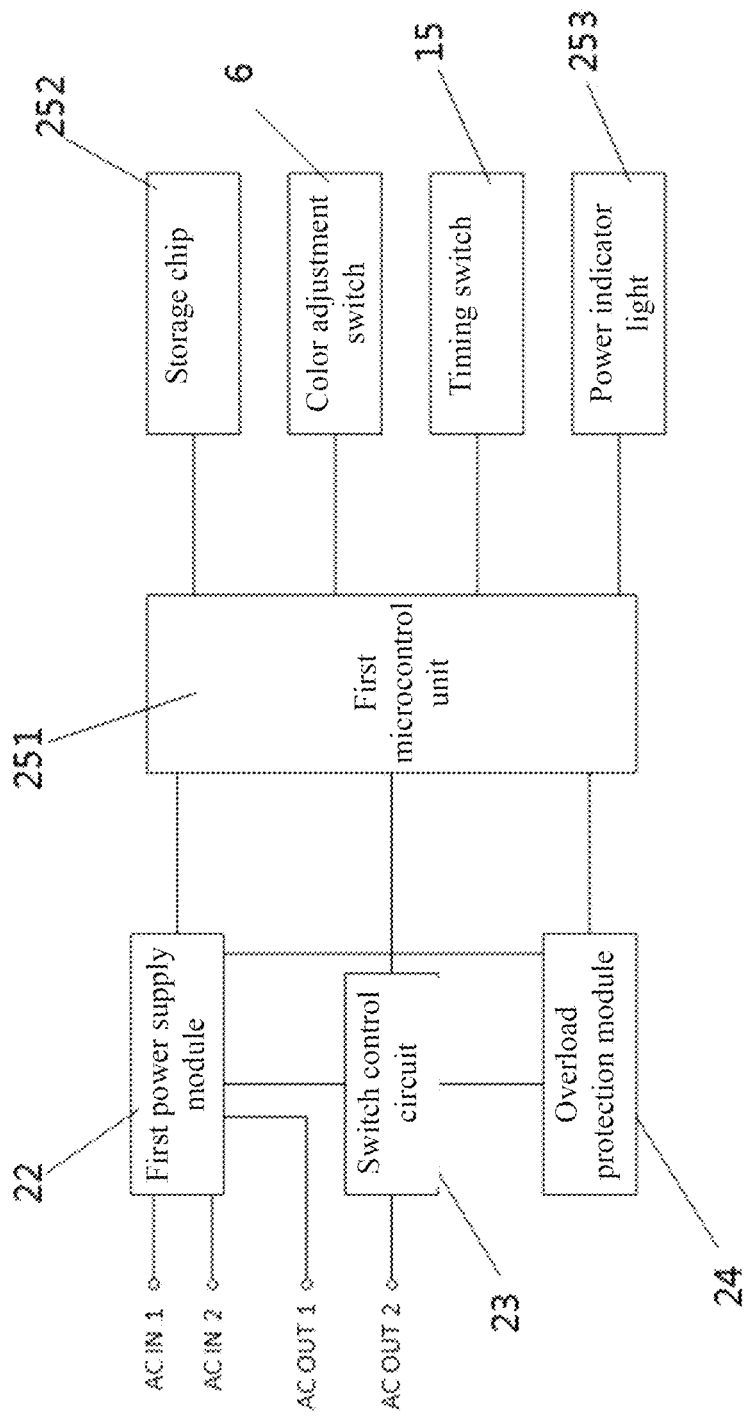
FIG. 3 is a circuit block diagram of a high voltage controller of an AC two-wire LED high voltage lamp string with synchronous dimming and color adjustment in the present invention.
Figure 4:
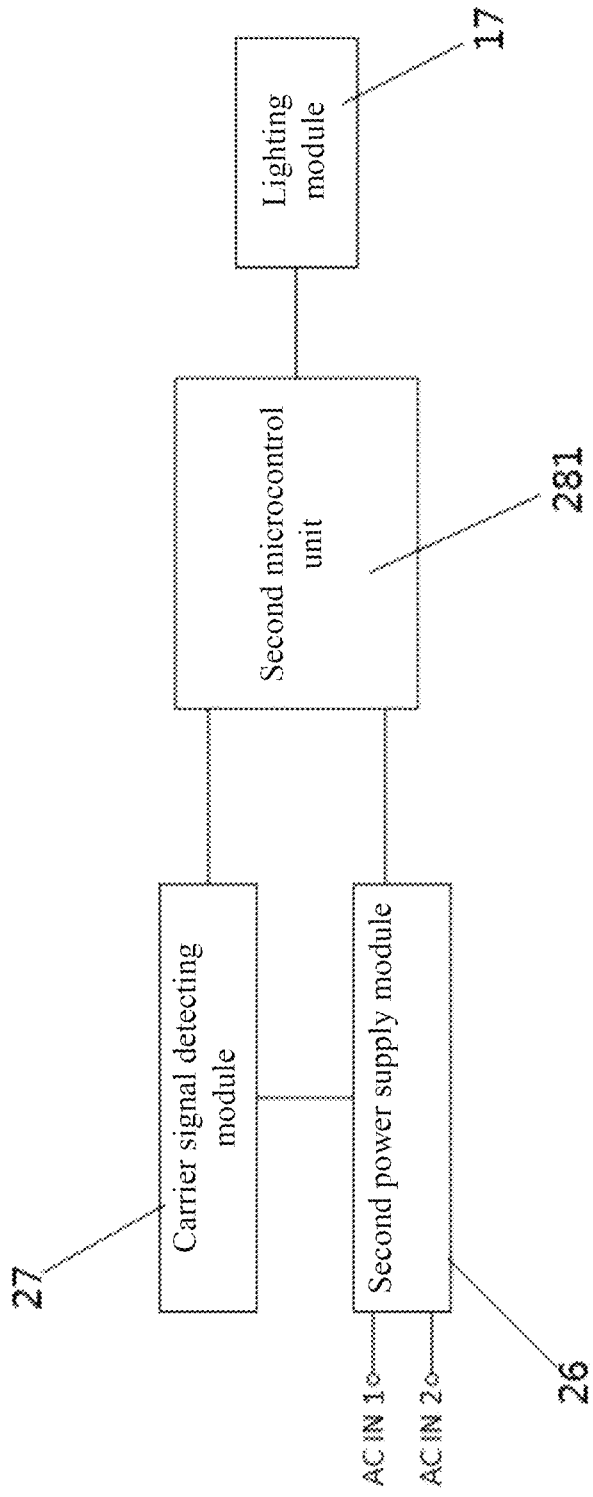
FIG. 4 is a circuit block diagram of an LED lamp of an AC two-wire LED high voltage lamp string with synchronous dimming and color adjustment in the present invention.
Figure 5:
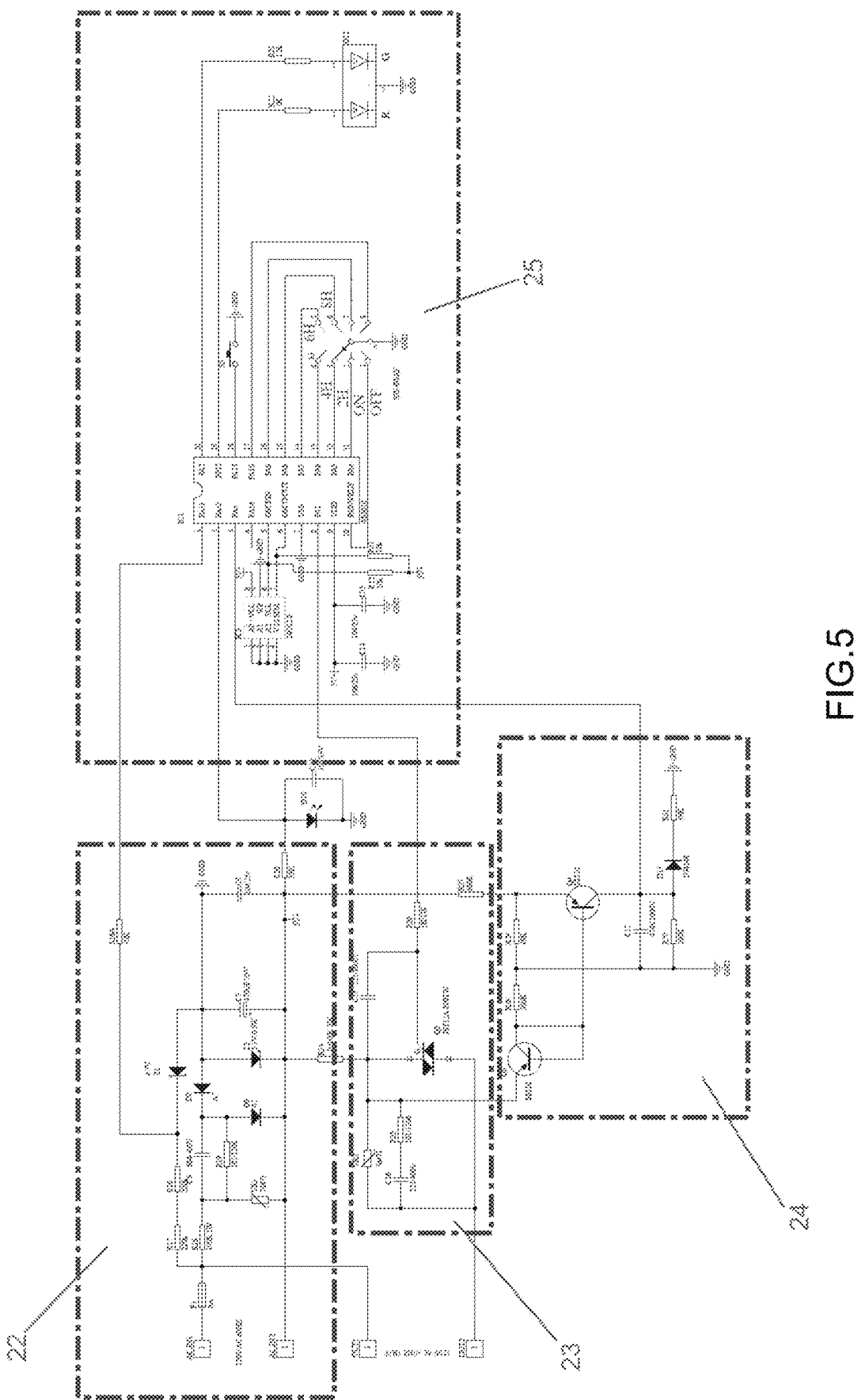
FIG. 5 is a schematic diagram of a high voltage controller of an AC two-wire LED high voltage lamp string with synchronous dimming and color adjustment in the present invention.
Figure 6:
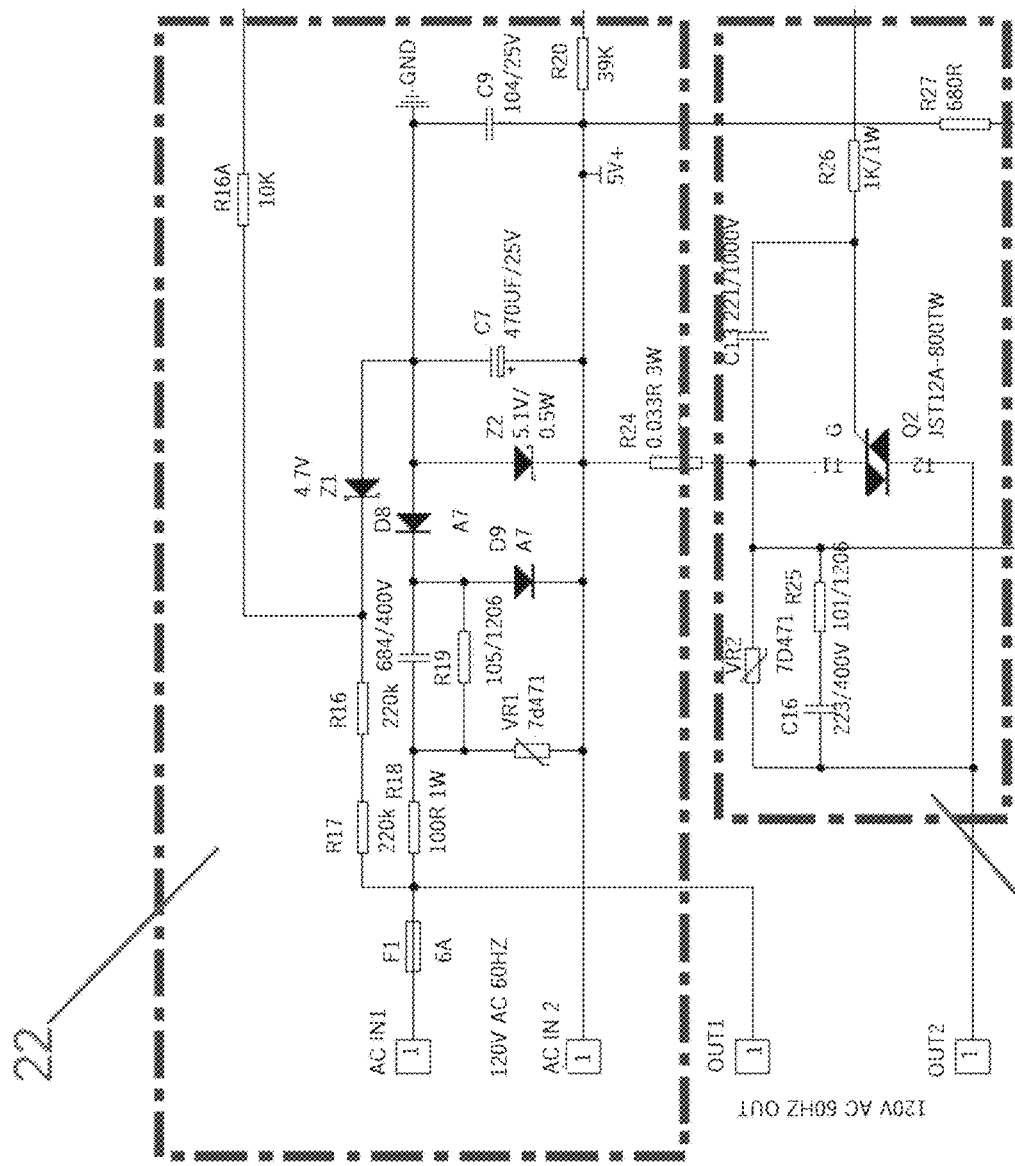
FIG. 6 is a local enlarged view of FIG. 5.
Figure 7:
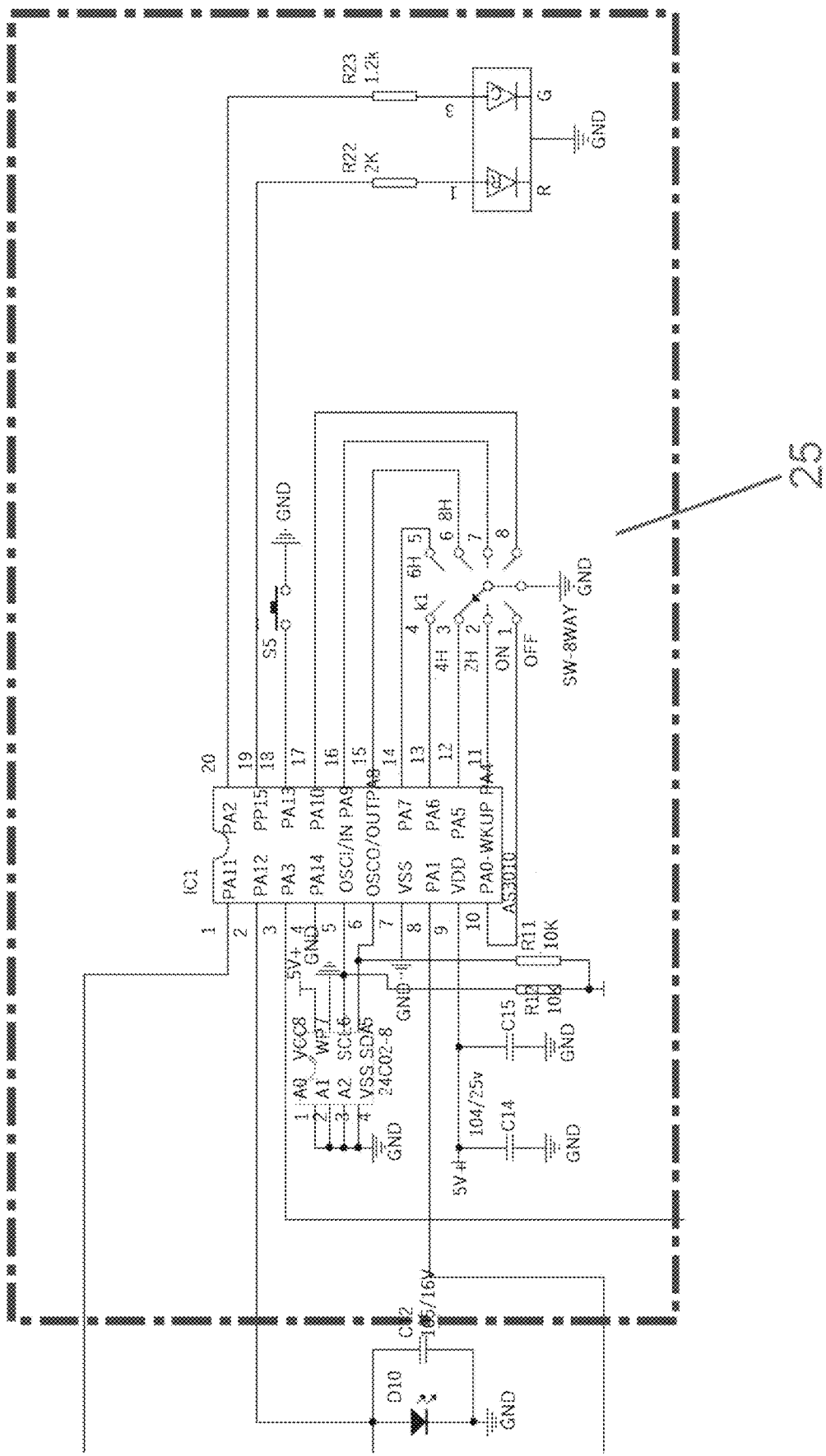
FIG. 7 is a local enlarged view of FIG. 5.
Figure 8:
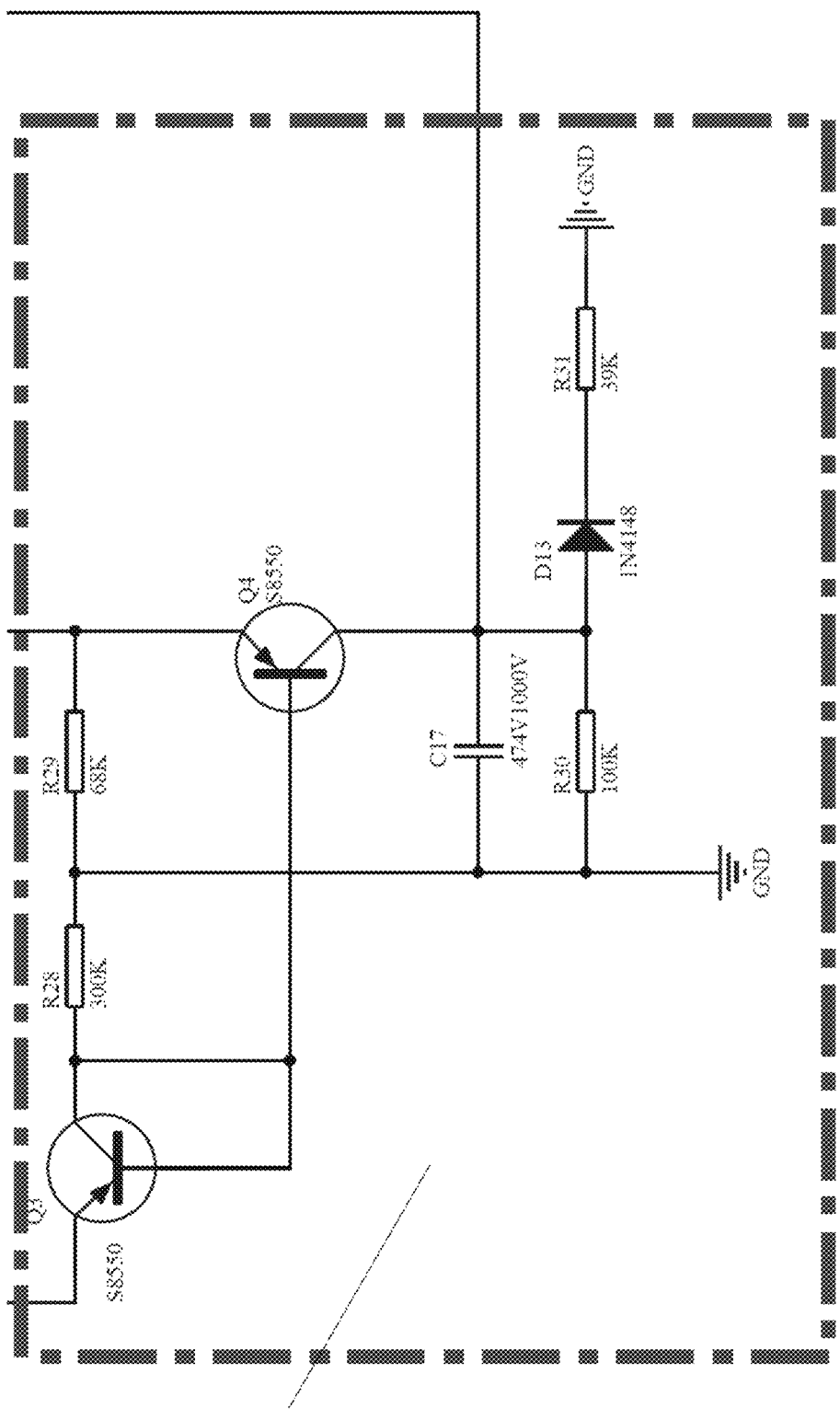
FIG. 8 is a local enlarged view of FIG. 5.

As shown in FIG. 2, the LED lamp comprises a conducting cap 21, a lamp cap 20, a connecting shell 19 and a lampshade 16 which are connected in sequence through threads; a power board module 18 and a lighting module 17 are arranged in the connecting shell 19; the power board module 18 comprises a power board, and a second power supply module 26, a carrier signal detecting module 27 and a second microcontrol unit 281 which are arranged on the power board; a slot is arranged in the connecting shell 19; and the power board is inserted into the slot.

The lighting module 17 comprises an LED board and an LED lamp bead arranged on the LED board; the LED board is fixedly connected with the power board; and the LED lamp bead is electrically connected with the second microcontrol unit 281.

The conducting cap 21 is inserted into the lamp cap 20 from the upper part of the lamp cap 20 and is electrically connected with the second power supply module 26; the upper part of the conducting cap 21 is connected with a conducting wire; the LED lamps are mutually connected through the conducting wire to form the lamp string group; and the end of the lamp string group is provided with a tail plug joint 8.

During use, a plurality of LED lamps are connected in series or in parallel to form the lamp string group; and the lamp string group is inserted into the high voltage controller through the tail plug joint 8. In the present embodiment, the high voltage controller is connected with a lamp string group formed by connecting 10 lamp strings in parallel, wherein each lamp string comprises 12 0.25 W LED lamps and each LED lamp can emit white, red, green and blue light.

The AC input end of the high voltage controller is connected with an external power supply through a plug 14. The color adjustment switch 6 arranged on the high voltage controller has the functions of short pressing and long pressing. After long pressing, four colors of white, red, green and blue in the LED lamp string group can synchronously flash circularly, and after short pressing, fixed-color normal lighting, waterfall lamp and horse race lamp modes can be selected. When restarting after power cut, the LED lamp string group has a power cut memory function.

The timing switch 15 arranged on the high voltage controller is a knob switch which comprises 8 options of OFF, ON, 2H, 4H, 6H, 8H, auto and straightway. When the knob switch is turned to "OFF", the LED lamp string group is turned off under the control of the high voltage controller. When the knob switch is turned to "ON", the LED lamp string group is normally lighted. When the knob switch is turned to "2H", the LED lamp string group has a light control function and is turned off after lighting for 2H every evening; and during the countdown process, the color adjustment switch 6 does not affect timing. When the knob switch is turned to "4H", the LED lamp string group has the light control function and is turned off after lighting for 4H every evening; and during the countdown process, the color adjustment switch 6 does not affect timing. When the knob switch is turned to "6H", the LED lamp string group has a light control function and is turned off after lighting for 6H every evening; and during the countdown process, the color adjustment switch 6 does not affect timing. When the knob switch is turned to "8H", the LED lamp string group has a light control function and is turned off after lighting for 8H every evening; and during the countdown process, the color adjustment switch 6 does not affect timing. When the knob switch is turned to "auto", the LED lamp string group has the light control function only without countdown; and when the LED lamp string group is restarted, the LED lamps have a color memory function. When the knob switch is turned to "straightway", if a plurality of lamp strings are connected for use, each lamp string is only controlled by the high voltage controller.

When the LED lamps are short-circuited or the LED lamp string causes current overload due to too many LED lamps connected in parallel, the overload protection module 24 transmits a voltage signal for the first microcontrol unit 251. After receiving the overload voltage signal, the first microcontrol unit 251 controls the switch control circuit 23 to close the silicon controlled rectifier and lock the circuit. The high voltage controller needs to be restarted to turn on the LED lamp string group.

The power indicator light 253 has two colors, i.e., red light and green light. When the LED lamp string group and the controller are in a normal state, the power indicator light 253 shows green. When the LED lamp string group and the controller are in an overcurrent protection state, the power indicator light 253 shows red.

Finally, it should be noted that the above embodiments are only used for describing the technical solutions of the present invention rather than limitation. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

What is claimed is:

1. An AC two-wire LED high voltage lamp string with synchronous dimming and color adjustment, comprising a high voltage controller and a lamp string group, wherein the high voltage controller comprises a control box, and a first power supply module, a switch control circuit, a first microcontrol unit and a mode adjustment switch which are arranged in the control box and connected in sequence; and the first microcontrol unit is connected with the first power supply module;

the first power supply module is provided with a first AC input end for external connection, and the first AC input end comprises a live line end and a neutral line end; the first microcontrol unit is used to receive a switch signal of the mode adjustment switch and transmit the signal to the switch control circuit; the switch control circuit is used for waveform modulation encoding of AC sine waves inputted by the first power supply module under the signal control of the first microcontrol unit;

the first microcontrol unit is used for zero-crossing detection of AC of the first power supply module;

the high voltage controller is also provided with an AC output end; the AC output end comprises a first AC output end connected with the first power supply module and a second AC output end connected with the switch control circuit; the control box is provided with a connecting hole, and the first AC input end and the AC output end are respectively connected with the outside through the connecting hole; the AC output end is connected with a connector, and the connector is detachably connected with the LED lamp string group;

the LED lamp string group comprises LED lamps which are connected mutually; the LED lamp string group is provided with a tail plug joint connected with the connector;

a second power supply module, a carrier signal detecting module, a second microcontrol unit and a lighting module are arranged in the LED lamps;

the second power supply module is provided with a second AC input end electrically connected with the AC output end, and the second power supply module is used for supplying power for the second microcontrol unit and the lighting module;

the second power supply module is connected with the carrier signal detecting module, the second microcontrol unit and the lighting module in sequence; the carrier signal detecting module is used for detecting a carrier signal received by the second AC input end and transmitting a carrier code value to the second microcontrol unit; after receiving the carrier signal, the second microcontrol unit executes a corresponding lighting instruction so that the lighting module enters a lighting mode which is set by the code value.

2. The AC two-wire LED high voltage lamp string with synchronous dimming and color adjustment according to claim 1, wherein the high voltage controller is also provided with an overload protection module; the overload protection module is respectively connected with the first power supply module, the switch control circuit and the first microcontrol unit for transmitting a voltage signal to the first microcontrol unit when the first power supply module and the switch control circuit are overloaded; and the first microcontrol unit is used for controlling the switch control circuit to cut off the switch after receiving the overload voltage signal.

3. The AC two-wire LED high voltage lamp string with synchronous dimming and color adjustment according to claim 1, wherein the LED lamp comprises a lamp cap, a connecting shell and a lampshade which are connected in sequence; the second power supply module, the carrier signal detecting module and the second microcontrol unit are arranged on a power board; the power board is arranged in the connecting shell; the lighting module comprises an LED board and an LED lamp bead arranged on the LED board; the LED lamp bead is electrically connected with the second microcontrol unit; and the LED board is arranged in the connecting shell.

4. The AC two-wire LED high voltage lamp string with synchronous dimming and color adjustment according to claim 3, wherein the lamp cap, the connecting shell and the lampshade are connected in sequence through threads.

5. The AC two-wire LED high voltage lamp string with synchronous dimming and color adjustment according to claim 3, further comprising a slot arranged in the connecting shell, wherein the power board is inserted into the slot and the LED board is fixedly connected with the power board.

6. The AC two-wire LED high voltage lamp string with synchronous dimming and color adjustment according to claim 3, further comprising a photodiode which is connected with the second microcontrol unit for light control.

7. The AC two-wire LED high voltage lamp string with synchronous dimming and color adjustment according to claim 3, further comprising a conducting cap arranged above the lamp cap, wherein the conducting cap is inserted into the lamp cap and electrically connected with the second AC input end; and the upper end of the conducting cap is connected with a conducting wire.

8. The AC two-wire LED high voltage lamp string with synchronous dimming and color adjustment according to claim 1, wherein the mode adjustment switch comprises a color adjustment switch and a timing switch; the color adjustment switch and the timing switch are respectively connected with a button and a knob; and the button and the knob are arranged on the outer wall of the control box.

9. The AC two-wire LED high voltage lamp string with synchronous dimming and color adjustment according to claim 1, further comprising a storage chip, wherein the storage chip is connected with the first microcontrol unit, and the storage chip is used to store operating state data and realize power off memory.

10. The AC two-wire LED high voltage lamp string with synchronous dimming and color adjustment according to claim 1, further comprising an indicator lamp arranged on the control box, wherein the indicator lamp is connected with the first microcontrol unit.

* * * * *